(12) United States Patent
Wahby et al.

(10) Patent No.: US 9,531,253 B2
(45) Date of Patent: Dec. 27, 2016

(54) SOFT-START FOR ISOLATED POWER CONVERTER

(71) Applicant: Silicon Laboratories Inc., Austin, TX (US)

(72) Inventors: Riad S. Wahby, New York, NY (US); Jeffrey L. Sonntag, Austin, TX (US); Tufan C. Karalar, Mountain View, CA (US); Michael J. Mills, Austin, TX (US); Eric B. Smith, Austin, TX (US); Ion C. Tesu, Austin, TX (US); Donald E. Alfano, Round Rock, TX (US)

(73) Assignee: Silicon Laboratories Inc., Austin, TX (US)

( * ) Notice: Subject to any disclaimer, the term of this patent is extended or adjusted under 35 U.S.C. 154(b) by 69 days.

(21) Appl. No.: 14/168,854

(22) Filed: Jan. 30, 2014

(65) Prior Publication Data

US 2015/0214826 A1 Jul. 30, 2015

(51) Int. Cl.
*H02M 1/36* (2007.01)
*H02M 3/335* (2006.01)
*H02M 1/00* (2006.01)

(52) U.S. Cl.
CPC ........... *H02M 1/36* (2013.01); *H02M 3/33507* (2013.01); *H02M 2001/0009* (2013.01)

(58) Field of Classification Search
CPC ...... H02M 1/084; H02M 1/088; H02M 1/096; H02M 1/092; H02M 3/33546; H02M 3/33569; H02M 3/335; H02M 2001/009; H02M 1/36; H02M 3/33507; H02M 2001/0009; H02M 1/08
USPC ....... 323/238, 135, 908, 901, 288, 282, 284; 363/49

See application file for complete search history.

(56) References Cited

U.S. PATENT DOCUMENTS

| 5,963,437 A * | 10/1999 | Sekiya ............. H02M 3/33569 363/131 |
| 6,480,402 B2 | 11/2002 | Adragna et al. |
| 7,016,204 B2 | 3/2006 | Yang et al. |
| 7,667,500 B1 | 2/2010 | Alfke |
| 7,719,305 B2 | 5/2010 | Chen |

(Continued)

OTHER PUBLICATIONS

U.S. Appl. No. 14/143,504, filed Dec. 30, 2013, entitled "Suppression of Transients in communications Across an Isolation Barrier," naming Michael J. Mills et al. as inventors.

(Continued)

*Primary Examiner* — Jessica Han
*Assistant Examiner* — Lorena Bruner
(74) *Attorney, Agent, or Firm* — Zagorin Cave LLP

(57) ABSTRACT

Current flowing through an inductor on a primary side of a voltage converter is sensed and compared to a threshold peak current value to determine when to end an ON portion of the voltage converter. The secondary side of the voltage converter supplies an indication of output voltage for use in determining the threshold peak current value. On start-up the primary side detects when the indication of output voltage is supplied by the secondary side across on isolation channel. Prior to detecting the indicating is being supplied, the primary side uses an increasing threshold peak current as the threshold peak current value. After detection that the indication of output voltage is being provided by the secondary side, the threshold peak current value is based on the indication of the output voltage.

25 Claims, 2 Drawing Sheets

(56) References Cited

U.S. PATENT DOCUMENTS

| | | | |
|---|---|---|---|
| 8,385,043 B2 | 2/2013 | Ng et al. | |
| 2008/0031021 A1* | 2/2008 | Ros | H02M 1/4258 363/46 |
| 2009/0147547 A1* | 6/2009 | Yamashita | H02M 3/33507 363/21.16 |
| 2010/0321693 A1* | 12/2010 | Cho | B82Y 35/00 356/365 |
| 2011/0002147 A1* | 1/2011 | Fukui | H02M 3/33507 363/21.12 |
| 2011/0199798 A1* | 8/2011 | Matthews | H02M 3/33523 363/79 |
| 2011/0255315 A1* | 10/2011 | Ono | H02M 3/33523 363/49 |
| 2012/0163040 A1* | 6/2012 | Zhang | H02M 3/335 363/21.12 |
| 2012/0230069 A1* | 9/2012 | Tzeng | H02M 3/33507 363/49 |
| 2013/0162048 A1* | 6/2013 | Kim | H02J 1/102 307/82 |
| 2013/0242626 A1* | 9/2013 | Li | G05B 9/02 363/50 |

OTHER PUBLICATIONS

U.S. Appl. No. 14/168,847, filed Jan. 30, 2014, entitled "Pseudo-Constant Frequency Control for Voltage Converter," naming Riad Wahby as inventor.

* cited by examiner

SOFT-START FOR ISOLATED POWER CONVERTER

BACKGROUND

1. Field of the Invention

This invention relates to voltage converters and more particularly to start-up of voltage converters.

2. Description of the Related Art

Voltage converters are used in various applications to translate an input voltage to an output voltage. Switching converters may provide, e.g., regulated DC output voltage from an unregulated AC input or a translated DC output from a DC input. Such converters can be required when the voltage level of available power needs to be changed to meet the requirements of circuitry that operates at a higher or lower voltage than the available voltage.

Some voltage converters have an isolation barrier between the primary side that receives an input voltage to be translated and the secondary side. Isolation barrier refers to an electrical isolation between two domains. Such isolation may be needed because during normal operation a large DC or transient voltage difference exists between the domains. For example, one domain may be "grounded" at a voltage which is switching with respect to earth ground by hundreds or thousands of volts. Another reason for such isolation is based on safety, even when the expected voltage difference between the domains is small in normal operation. When a voltage converter starts up, it can take time until the secondary side receives sufficient power to also start up. Thus, the primary side may be operational before the secondary side. When operation of the voltage converter depends on feedback from the secondary side, the voltage converter still needs to operate as the secondary side begins to receive power under start-up conditions. Improvements in start-up operations of voltage converters are desirable.

SUMMARY OF EMBODIMENTS OF THE INVENTION

Accordingly, in one embodiment a voltage converter, having a switching cycle with an ON portion and an OFF portion, includes a current control loop to sense current through an inductor on a primary side of the voltage converter and to compare the sensed current to a threshold peak current value to determine when to end the ON portion by turning off a switch, the current flowing through the inductor and the switch during the ON portion. A start-up circuit detects when a secondary side of the voltage converter is supplying an indication of output voltage. A soft start threshold peak current generator supplies an increasing threshold peak current value prior to detection that the indication of output voltage is being provided by the secondary side. The indication of output voltage from the secondary side is used to generate the threshold peak current value after the detection that the indication is being provided by the secondary side.

In another embodiment a method is provided that includes sensing current flowing through an inductor on a primary side of a voltage converter. The sensed current is compared to a threshold peak current value to determine when to end an ON portion of the voltage converter having a switching cycle with the ON portion and an OFF portion to control the current through the inductor. The method further includes detecting when a secondary side of the voltage converter supplies an indication of output voltage for use in determining the threshold peak current value. Prior to detection of the indication of output voltage being provided by the secondary side; supplying an increasing threshold peak current as the threshold peak current value, the increasing threshold peak current being generated without the indication of the output voltage. After detection that the indication of output voltage is being provided by the secondary side, generating the threshold peak current based on the indication of the output voltage.

In another embodiment a method is provided that includes sensing output voltage on a secondary side of a voltage converter. For a first period of time the secondary side sends proportional control information as an indication of a difference between the output voltage and a reference voltage to the primary side of the voltage converter. After an end of the first period of time, the secondary side sends proportional and integral control information to the primary side as the indication of the difference between the output voltage and the reference voltage.

In another embodiment an apparatus includes a first circuit to provide an indication of a difference between an output voltage on a secondary side of a voltage converter and a reference voltage. A selector circuit selects for a first period of time proportional control information corresponding to the indication and selects after an end of the first period of time, proportional and integral control information as the indication of the difference between the output voltage and the reference voltage. A transmitter of a communication channel coupled to the selector circuit to transmit the selected information.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DETAILED DESCRIPTION

Figure 1:
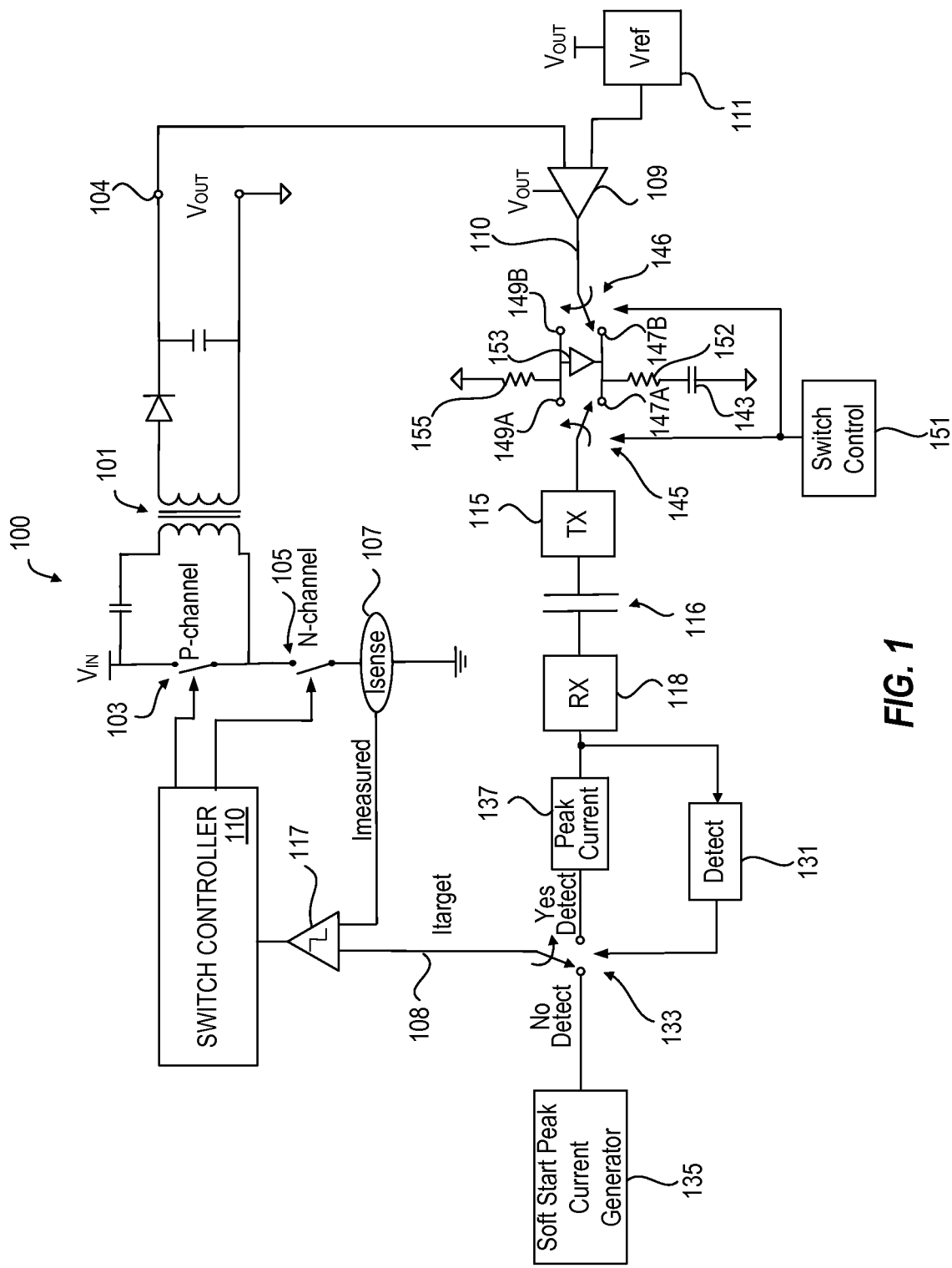
FIG. 1 illustrates a voltage converter according to an embodiment.

FIG. 1 illustrates a voltage converter 100 with isolation between the input side and the output side. The isolation is provided by the transformer 101 and the isolation communication channel 116. Normal operation of the exemplary converter 100 is as follows. The voltage converter 100 includes a transformer 101 including primary side and secondary side coupled inductors. Switches 103 and 105 are used to control the switching cycle. Current sense circuit 107 senses the current through the primary winding and provides the measurement to comparator 117. The controller 110 determines when to turn on and off the switches 103 and 105 and thus control the power supplied to the secondary side of the voltage converter 100. When the measured current exceeds a target peak current (Itarget) 108, the switch 105 turns off and the switch 103 turns on. In an embodiment the switch 103 is implemented as a P-channel device and the switch 105 is implemented as an N-channel device. The output voltage $V_{OUT}$ determines the target peak current value. In the particular embodiment shown in FIG. 1, comparator 109 compares the output voltage with a reference voltage 111 and supplies an indication of the comparison that is used to adjust the target peak current. If output voltage is too low, the target peak current is increased to increase the amount of energy that is input so as to raise the output voltage. Thus, a current control loop compares the measured current to a target current to control the ON time of switch 105 on a cycle-by-cycle basis. The isolation channel 116 includes an isolation transmitter 115 on the secondary side and a receiver 118 on the primary side. The isolation channel may be capacitive, optical, transformer-based, or any suitable isolation channel to provide feedback information from the secondary side to the primary side.

Figure 2:
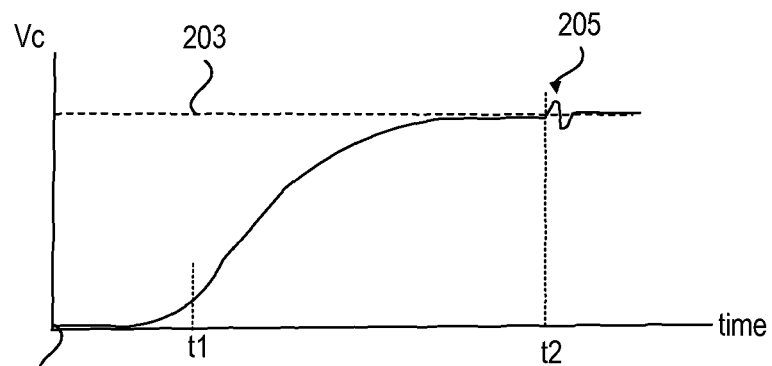
FIG. 2 illustrates an exemplary output voltage waveform.

On power-up or start-up, the controller 110 starts having power immediately because the controller 110 is on the input side. However the secondary side does not have power. Thus, there is no feedback from the secondary side as comparator 109, the reference voltage 111, and isolation transmitter 115 are not yet available. Thus, the control loop providing feedback information on the output voltage is open at start-up. FIG. 2 illustrates the power available to the secondary side at startup. Start-up occurs at 201. Normal secondary side voltage is shown at 203.

The goal of the control logic on the primary side is to smoothly start up the voltage converter given there is no feedback and thus no voltage control loop initially to help determine the target peak current value. Such a start-up condition is referred to herein as a soft start of the converter. For a non-isolated converter and assuming the secondary side is powered at the same time as the primary side, a simple way to start the converter would be to starting ramping the reference voltage 111 from zero until it reaches a final value that is close to a correct operating point for the voltage converter. However, in isolated power converters, such as the voltage converter illustrated in FIG. 1, the reference voltage 111 is on the secondary side so there is no feedback initially from the output voltage. There is a need to get power to the secondary side on start-up while maintaining safe current and voltage levels on both the input and output sides. Thus, the voltage converter should behave smoothly during start-up, e.g., without jagged or sharp current spikes risking over-current conditions or otherwise undesirable operating conditions for the power supply that supplies power to the primary side of the voltage converter. In addition, there is a desire to ensure voltage on the secondary side remains at acceptable levels to avoid damaging components on the secondary side. Thus, the goal is to start without feedback and eventually close the control loop with output voltage feedback in a smooth way.

In an embodiment that can be accomplished in several stages. Since the secondary is not powered during initial start-up, there is no signal coming through the isolation channel 116. The primary side begins start-up by sending a small amount of power to the secondary side and slowly increasing the amount of power supplied. In normal operation, the output voltage determines the peak current. With the output voltage value unavailable, the control system on the primary side starts the peak current target at a low level, e.g., at or near zero, and gradually increases the peak current target value. The peak current value generally corresponds to an average current on the secondary side. If the current going into the capacitor on the output side is ramped linearly, then the capacitor acts to integrate the ramp and a parabolic voltage function results. Thus, a linearly ramping current results in a parabolic voltage output. Under such circumstances, the output voltage starts increasing faster and faster and care must be exercised to ensure that the voltage does not run away and cause an over voltage condition on the secondary side.

Figure 3:
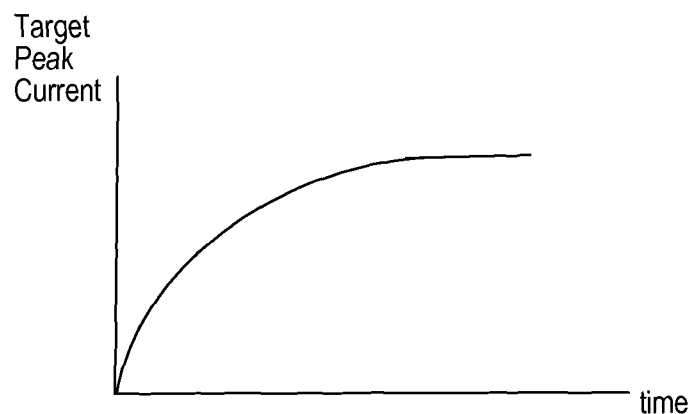
FIG. 3 illustrates an exemplary ramp function that may be associated with generating a target peak current value during start-up.

Rather than use a linear ramp for the peak current, an embodiment uses an exponential function to increase the target peak current. An example of such a function is shown in FIG. 3 where the exemplary exponential function is of the form $1-e^{-t/\tau}$, where $\tau$ is a time constant. The curve may resemble an RC charging waveform. A benefit of using such a waveform is that its integral has nearly constant slope. Thus, using an exponential ramp for the peak current target can result in a smoother output voltage increase with less risk of run away voltage. So the current each cycle is increased by ramping the target peak current value, linearly, exponentially, or by some other appropriate function until a sufficient voltage is reached on the secondary side so that the secondary side can begin sending feedback information on the output voltage so the control loop can be closed.

Referring again to FIG. 1 a detect circuit 131 is coupled to the receiver 118 on the isolation channel. During the start-up sequence, initially the secondary side will not be transmitting. The detect circuit 131 detects edges in a manner known in the art, or detects other appropriate activity on the isolation channel indicating the isolation channel is active depending on the implementation of the isolation channel. The detector during the initial portion of the start-up sequence supplies a "no detect" signal to switch 133 indicating that there is no activity on the isolation channel. The switch in response selects the peak current target value 108 from the soft start peak current generator 135. The soft start peak current generator may be implemented as an RC circuit or a digital to analog converter or an appropriate circuit to generate the desired ramp.

Figure 4:
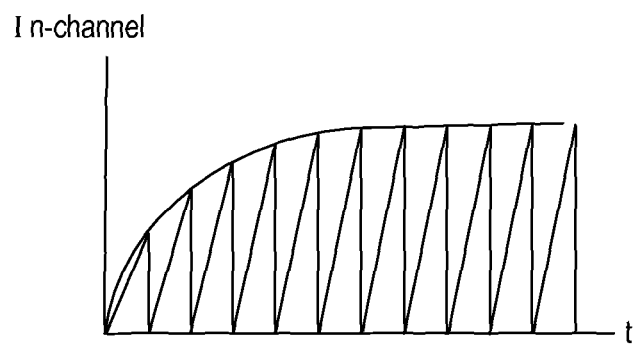
FIG. 4 illustrates current through the n-channel switch in an embodiment.

As described earlier, the target peak current may be increased linearly, with an exponential function, or in another appropriate manner. The control logic controls the switches 103 and 105 using the soft start generated target peak current until the detector 131 detects activity on the isolation channel 116. When the isolation channel becomes active the detect circuit supplies a "yes detect" value to the switch 133 causing the switch to select the target peak current value that is based on the feedback from the secondary side. The peak current circuit 137 generates the target peak current based on the output voltage. The exact function of the peak current circuit depends on the nature of the feedback. Some systems may feedback the output voltage value itself. Other embodiments may feedback an error signal indicative of the difference between the output voltage and a reference voltage as shown in FIG. 1. In either case, the peak current circuit generates an appropriate peak current value (higher or lower or the same) based on the value of the output voltage and supplies that value to the comparator 117. For example, if the output voltage is too low, the target peak current is increased to increase the output voltage. FIG. 4 illustrates an example of current through n-channel switch 105 during start-up while the soft start peak current generator is supplying the target peak current values. Once the primary side begins receiving output voltage values from the secondary side, the control on the primary side considers the voltage control loop to be closed.

However, for certain embodiments having a transfer function (a loop compensation circuit) on the secondary side with a state holding variable, the feedback data may be inaccurate because the state holding variable may not start with a correct initial value. For example, assume the voltage control loop utilizes proportional plus integral (P+I) control.

Such control is well known in the art. Proportional control provides feedback that indicates the current state of the output voltage. Integral control provides an integration or history of the output voltage. Referring again to FIG. 1, proportional control in the illustrated embodiment, compares the reference voltage 111 to the output voltage on node 104 and multiplies that difference by a gain factor in the amplifier 109, which provides a current 110 corresponding to the difference multiplied by the gain factor. The particular gain factor depends on the compensation utilized in the specific embodiment. The state variable in FIG. 1 is represented by capacitor 143. At the time there is sufficient voltage to provide feedback information across the isolation channel, the state variable 143 is not sufficiently charged. Accordingly, in order to provide more accurate feedback information, the secondary side sends back only proportional control information for a period of time. After the period of time has expired, the secondary side sends back proportional and integral control by having switches 145 and 146 select nodes 147A and 147B instead of nodes 149A and 149B. Control of the switches 145 and 146 may be accomplished using a switch control logic 151, which in one embodiment is implemented using a timer. When switches 145 and 146 are in the "up" position (that is, before the timer expires), the voltage developed on terminals 149A and 149B is buffered to terminals 147A and 147B through buffer 153, precharging the capacitance 143. Note that a voltage results when the output current 110 flows from terminal 149B through the resistor 155 to ground. A constant voltage is obtained for a constant current and as the current changes, the voltage changes (nearly) instantaneously. On the other hand, when the switches 145 and 146 are in the "down" position, the voltage on terminals 147A and 147B is a function that includes both gain and integration, so the voltage on terminals 147A and 147B changes (comparatively) slowly. Initially, terminal 149A gives (almost) the correct result, and this is buffered onto terminals 147A and 147B for some period in order to charge capacitor 143.

After a sufficient amount of time has passed as determined by switch control logic 151, the state variable is presumed to have a good initial value, i.e. the capacitor 143 has charged up. When switching over to P+I control, a small transient may be expected. FIG. 2 illustrates operation of the feedback mechanism. At time t1 assume the power is sufficient for the isolation channel to provide feedback information. The timer causes only proportional control information to be fed back until time t2 at which time P+I feedback is provided resulting in a small transient at 205. The charging of the state element based on the proportional feedback information between t1 and t2 allows a reasonable accurate precharge or initialization of the state element allowing an acceptably small transient when the control switches to proportional plus integral control at time t2. Rather than use a timer, in another embodiment switch control logic stops precharging the state variable based on the rate of change of the state variable, e.g., by measuring the charging current into the capacitor and if the charging current is less than a predetermined threshold, e.g., charging current is zero, it can be assumed that the precharge is sufficiently accurate. The particular approach used by control logic 151 to measure the charging current, which approaches are well known in the art, e.g., based on the voltage across resistor 152, is not shown for ease of illustration. Thus, in various embodiments the loop can be closed with just proportional control information being provided while the state variable is being initialized with a reasonably accurate precharge, e.g., within 5 or 10%, and with a small transient occurring on switching to P+I control.

Thus, various approaches have been described relating to start-up of a voltage controller. The description of the invention set forth herein is illustrative, and is not intended to limit the scope of the invention as set forth in the following claims. Other variations and modifications of the embodiments disclosed herein, may be made based on the description set forth herein, without departing from the scope of the invention as set forth in the following claims.

What is claimed is:

1. A voltage converter having a switching cycle with an ON portion and an OFF portion, the voltage converter comprising:
    a current control loop to sense current flowing through an inductor on a primary side of the voltage converter and to compare sensed current to a threshold peak current value to determine when to end the ON portion by turning off a switch, the current flowing through the inductor and the switch during the ON portion; and
    a start-up circuit to detect when a secondary side of the voltage converter is supplying an indication of output voltage to the primary side;
    a soft start threshold peak current generator coupled to supply a soft start threshold peak current value to the current control loop as the threshold peak current value prior to the start-up circuit detecting that the indication of output voltage is being provided by the secondary side; and
    wherein the indication of output voltage from the secondary side is used to generate the threshold peak current value after detection that the indication is being provided by the secondary side.

2. The voltage converter as recited in claim 1, wherein the soft start threshold peak current generator supplies the soft start threshold peak current value starting from at or near a zero current value and then increasing in value.

3. The voltage converter as recited in claim 1, wherein the soft start threshold peak current generator supplies the soft start threshold peak current value as a ramp function increasing in value with time.

4. The voltage converter as recited in claim 1, wherein the soft start threshold peak current generator supplies the soft start threshold peak current value in the form of an exponential function.

5. The voltage converter as recited in claim 4, wherein the exponential function is of the form $1-e^{-t/\tau}$, where t is time and $\tau$ is a time constant.

6. The voltage converter as recited in claim 1 further comprising an isolation channel over which the secondary side of the voltage converter supplies a comparison between the output voltage and the reference voltage as the indication of output voltage.

7. The voltage converter as recited in claim 6 further comprising a voltage control loop to sense output voltage of the voltage converter and to compare the sensed output voltage to a reference voltage and to supply as the indication a difference between the output voltage and the reference voltage.

8. The apparatus as recited in claim 1 further comprising:
    a first circuit to provide an indication of a difference between the output voltage on the secondary side of the voltage converter and a reference voltage;
    a selector circuit to select for a first period of time proportional control information corresponding to the indication of the difference between the output voltage and the reference voltage and to select after an end of the first period of time, proportional and integral control information as the indication of the difference between the output voltage and the reference voltage; and a transmitter of a communication channel coupled to the selector circuit to transmit the selected information to the primary side as the indication of the output voltage.

9. The apparatus as recited in claim 8 further comprising:
a state variable to store the integral control information;
a charging circuit to charge a capacitor implementing the state variable during the first period of time based on the proportional control information.

10. The apparatus as recited in claim 8 further comprising a timer circuit to determine the end to the first period of time.

11. A method comprising:
sensing current flowing through an inductor on a primary side of a voltage converter;
comparing sensed current to a threshold peak current value to determine when to end an ON portion of the voltage converter having a switching cycle with the ON portion and an OFF portion to control the current through the inductor;
detecting when a secondary side of the voltage converter supplies an indication of output voltage for use in determining the threshold peak current value;
supplying an increasing threshold peak current as the threshold peak current value prior to detection of the indication of output voltage being provided by the secondary side, the increasing threshold peak current being generated without the indication of the output voltage; and
after detection of the indication of output voltage being provided by the secondary side, generating the threshold peak current value based on the indication of the output voltage.

12. The method as recited in claim 11, further comprising supplying the increasing threshold peak current value starting from at or near a zero current value.

13. The method as recited in claim 11, further comprising supplying the increasing threshold peak current value as a ramp function.

14. The method as recited in claim 11, further comprising supplying the increasing threshold peak current value based on an exponential function.

15. The method as recited in claim 14 wherein the exponential function is of the form $1-e^{-t/\tau}$, where t is time and $\tau$ is a time constant.

16. The method as recited in claim 11 further comprising supplying a comparison between the output voltage and a reference voltage from the secondary side of the voltage converter over an isolation channel to the primary side of the voltage converter as the indication of the output voltage.

17. The method as recited in claim 16 further comprising:
sensing the output voltage of the voltage converter;
comparing the sensed output voltage to the reference voltage; and
supplying as the indication of the output voltage a difference between the output voltage and the reference voltage.

18. The method as recited in claim 11 further comprising:
sensing the output voltage on the secondary side of the voltage converter;
for a first period of time sending, as the indication of the output voltage, proportional control information indicating a difference between the output voltage and a reference voltage from the secondary side to the primary side; and
after an end of the first period of time, sending, as the indication of the output voltage, proportional and integral control information to indicate the difference between the output voltage and the reference voltage from the secondary side to the primary side.

19. The method as recited in claim 18 further comprising:
initializing a state variable used for the integral control information based on the proportional control information.

20. The method as recited in claim 19 further comprising initializing the state variable by charging a capacitor based on the proportional control information.

21. The method as recited in claim 19 further comprising determining the end of the first period of time based on charging current supplied to the capacitor.

22. The method as recited in claim 19 wherein the proportional control information corresponds to the difference between the output voltage and the reference voltage multiplied by a gain factor.

23. The method as recited in claim 18 further comprising determining the end of the first period of time according to passage of a predetermined amount of time.

24. The method as recited in claim 18 further comprising sending the proportional control and the proportional and integral control information to the primary side across an isolation barrier.

25. A voltage converter having a switching cycle with an ON portion and an OFF portion, the voltage converter comprising:
a primary side and a secondary side;
the primary side including,
a current control loop to sense current flowing through an inductor on a primary side of the voltage converter and to compare sensed current to a threshold peak current value to determine control of the switching cycle, the current flowing through the inductor and the switch during the ON portion;
a start-up detect circuit to detect when the secondary side of the voltage converter is supplying an indication of output voltage to the primary side over an isolation communication channel;
a soft start threshold peak current generator to supply a soft start threshold peak current value to the current control loop as the threshold peak current value prior to the start-up circuit detecting that the indication of output voltage is being provided by the secondary side; and
wherein the indication of output voltage from the secondary side is used to generate the threshold peak current value after detection that the indication is being provided by the secondary side.

* * * * *